(12) United States Patent
Cole et al.

(10) Patent No.: US 7,890,532 B2
(45) Date of Patent: Feb. 15, 2011

(54) COMPLEX DATA ACCESS

(75) Inventors: Daniel J. Cole, Redmond, WA (US); Gloria M. Godfrey, Kirkland, WA (US); Neil W. Black, Seattle, WA (US); Sumit Chauhan, Redmond, WA (US); Suraj T. Poozhiyil, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 471 days.

(21) Appl. No.: 11/013,619

(22) Filed: Dec. 15, 2004

(65) Prior Publication Data

US 2006/0129572 A1 Jun. 15, 2006

(51) Int. Cl.
*G06F 7/00* (2006.01)
*G06F 17/00* (2006.01)

(52) U.S. Cl. .............. 707/790; 707/791; 707/802; 707/705; 707/999.1; 707/999.102

(58) Field of Classification Search .............. 707/102, 707/705, 713, 790–812
See application file for complete search history.

(56) References Cited

U.S. PATENT DOCUMENTS

| | | | |
|---|---|---|---|
| 6,061,690 A * | 5/2000 | Nori et al. ............. | 707/999.103 |
| 6,122,644 A | 9/2000 | Graefe et al. | |
| 6,526,406 B1 * | 2/2003 | Suzuki et al. ............ | 707/999.1 |
| 6,564,203 B1 | 5/2003 | Krishnaprasad et al. | |
| 6,892,204 B2 | 5/2005 | Haas et al. | |
| 2003/0236784 A1 | 12/2003 | Tang et al. | |
| 2004/0153435 A1 * | 8/2004 | Gudbjartsson et al. ......... | 707/1 |
| 2005/0091256 A1 * | 4/2005 | Rathakrishnan et al. ..... | 707/102 |
| 2005/0144163 A1 * | 6/2005 | Tang et al. .................... | 707/3 |

FOREIGN PATENT DOCUMENTS

| | | |
|---|---|---|
| EP | 1597655 | 5/2005 |
| RU | 36541 U1 | 3/2004 |

OTHER PUBLICATIONS

Zaharioudakis et al., "Answering complex SQL queries using automatic summary tables", International Conference on Management of Data Proceedings of the 2000 ACM SIGMOD international conference on Management of data, 2000, pp. 105-116. Download: http://portal.acm.org/citation.cfm?id=342009.335390&coll=GUIDE&dl=ACM&CFID=89366967&CFTOKEN=69714849.*

European Search Report for EP 05 11 1223, dated Feb. 16, 2006.

(Continued)

*Primary Examiner*—John E Breene
*Assistant Examiner*—Hares Jami
(74) *Attorney, Agent, or Firm*—Merchant & Gould PC

(57) ABSTRACT

Methods, systems, and computer-readable media implementing various aspects of complex data in a conceptual table are disclosed which enable complex data in the form of tables to be added to a conceptual table. The complex data can map to scalar values in a plurality of data tables. Complex data may be entered via data modeling methods, accessed via cursoring methods, and queried via query expansion methods.

14 Claims, 7 Drawing Sheets

OTHER PUBLICATIONS

Elmasri et al., "Fundamentals of Database Systems Fourth Edition," Fundamentals of Database Systems, No. ed4, Sep. 2004, XP 002336625, p. 255-263; p. 725-728.

Elmasri and S B Navathe R E, "Fundamentals of Database Systems, $2^{nd}$ Edition," Fundamentals of Database Systems, 1994, pp. 391-421, XP002249442, p. 410-411; figure 12.9.

Elmasri et al, "Fundamentals of Database Systems Fourth Edition," Fundamentals of Database Systems, XX, XX, No. ed4, Sep. 2004, p. 25-45, 207, XP002333626, p. 30; figure 2.2; p. 493-p. 495.

EP 05 11 1223, Communication from the Examining Division, dated Jan. 29, 2007, 1 pp.

EP 05 11 1223, Reply to Communication from the Examining Division, dated Jun. 21, 2007, 11 pp.

First Office Action, dated Jul. 18, 2008, issued in Chinese Application No. 200510125029.3, 5 pp.

Second Office Action, dated Jul. 17, 2009, issued in Chinese Application No. 200510125029.3, 3 pp.

Decision on Grant of a Patent for Invention, dated Jun. 7, 2010, issued in Russian Application No. 2005139141, 19 pp.

Examiner's First Report, dated May 10, 2010, issued in Australian Application No. 2005225020, 2 pp.

International Search Report, dated Nov. 25, 2005, issued in EP 1597655 (WO 2005/045582), 4 pp.

Notice on Grant of Patent Right for Invention and Proceeding with the Registration Formalities, dated Feb. 5, 2010, issued in Chinese Application No. 200510125029.3, 4 pp.

Response to First Office Action, dated Oct. 30, 2008, in Chinese Application No. 200510125029.3, 18 pp.

Response to Second Office Action, dated Sep. 30, 2009, in Chinese Application No. 200510125029.3, 48 pp.

Response to Examination Report, submitted in Australian Application No. 2005225020, dated Aug. 17, 2010, [19 pp.].

* cited by examiner

Fig. 1

COMPLEX DATA ACCESS

TECHNICAL FIELD

The present invention relates generally to the field of software applications. More particularly, the present invention relates to software applications that store data and report data, such as databases. More particularly still, aspects of the present invention relate to storing and querying data in such software applications.

BACKGROUND OF THE INVENTION

In order to manage large quantities of data, computer software applications, such as spreadsheet and database applications, have been developed to organize and store the data in a logical manner. Typical spreadsheet and database applications comprise a large number of records of information, wherein each record comprises a predetermined number of fields. In the context of a database, a database management system is typically used to provide the software tools to manipulate the database more simply. Example database management systems include Microsoft® Access and Microsoft® SQL Server, among others. Databases generally allow users to establish complex data interrelationships that are not available in spreadsheets, which increases their power while also making database applications even more difficult for new users to master.

A typical database management system provides the user the ability to add, modify or delete data, query data using filters, and the ability to report records in the database. Data in databases is typically represented using rows and columns. A field is an intersection of a row and a column. In general, any given field may only contain a single, scalar data value. Data queries typically take the form of a query language, such as Structured Query Language (SQL). Such queries may be performed on locally held data, or submitted to a database server for execution.

In some cases, a database may contain a hierarchy of data rather than a flat table of values. For example, in an issue tracking application, each issue may be assigned to one or more people. A user must therefore model this type of hierarchy using multiple linked tables, and query such tables using relatively complex queries that join data from multiple tables. More specifically, there might be one table of issues, and another table of people containing all the possible people who could have an issue assigned to them, and finally, a junction table where issues are assigned to people. Setting up such a hierarchy of tables can be both cumbersome and confusing to a user, especially a user new to database applications. Querying across such a hierarchy can be similarly problematic due the complex nature of multi-table queries, especially if a user lacks in-depth knowledge of the query language.

It is with respect to these considerations and others that the present invention has been made.

SUMMARY OF THE INVENTION

In accordance with the present invention, a computer-implemented method and computer-readable medium are provided for adding complex data to a conceptual table. A conceptual table is a table that contains at least one complex data type. A complex data type is one or more scalar columns and/or other complex types that are "grouped" together to form a single, new data type. First, a signal is received to add a complex data type to a table. One or more data tables are created. Additionally, links to the one or more data tables are created in the conceptual table.

In accordance with other aspects, the present invention relates to a computer-implemented method and computer-readable medium for modeling data in a conceptual table. First, a signal to store one or more data values is received. The structure of the conceptual table is analyzed, and one or more mappings to one or more data tables are determined. Finally, data is stored in the one or more data tables.

In accordance with yet other aspects, the present invention relates to a computer-implemented method and computer-readable medium for the expansion of a query of a conceptual table. First, a query of a conceptual table is received. Next, the structure of the conceptual table is analyzed, and one or more expansion rules are applied to the query. Finally, the expanded query is issued.

In accordance with still other aspects, the present invention relates to a computer-implemented method and computer-readable medium for cursoring in a conceptual table. First, a signal to access complex data in the conceptual table is received. One or more mappings associated with the complex data are read. Finally, scalar data from one or more data tables is read using the mappings.

In accordance with additional, other aspects, the present invention relates to a system for conceptual table modeling. A data modeling module adds complex data to the table, and stores complex data to one or more data tables. A query expansion module expands conceptual table queries to include one or more data table queries. A cursoring module retrieves complex data in a conceptual table.

The invention may be implemented as a computer process, a computing system or as an article of manufacture such as a computer program product or computer readable media. The computer readable media may be a computer storage media readable by a computer system and encoding a computer program of instructions for executing a computer process. The computer program readable media may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

BRIEF DESCRIPTION OF THE DRAWINGS

FIG. 1 shows a database environment in which an embodiment of the present invention may be implemented.

DETAILED DESCRIPTION OF THE INVENTION

Figure 1:
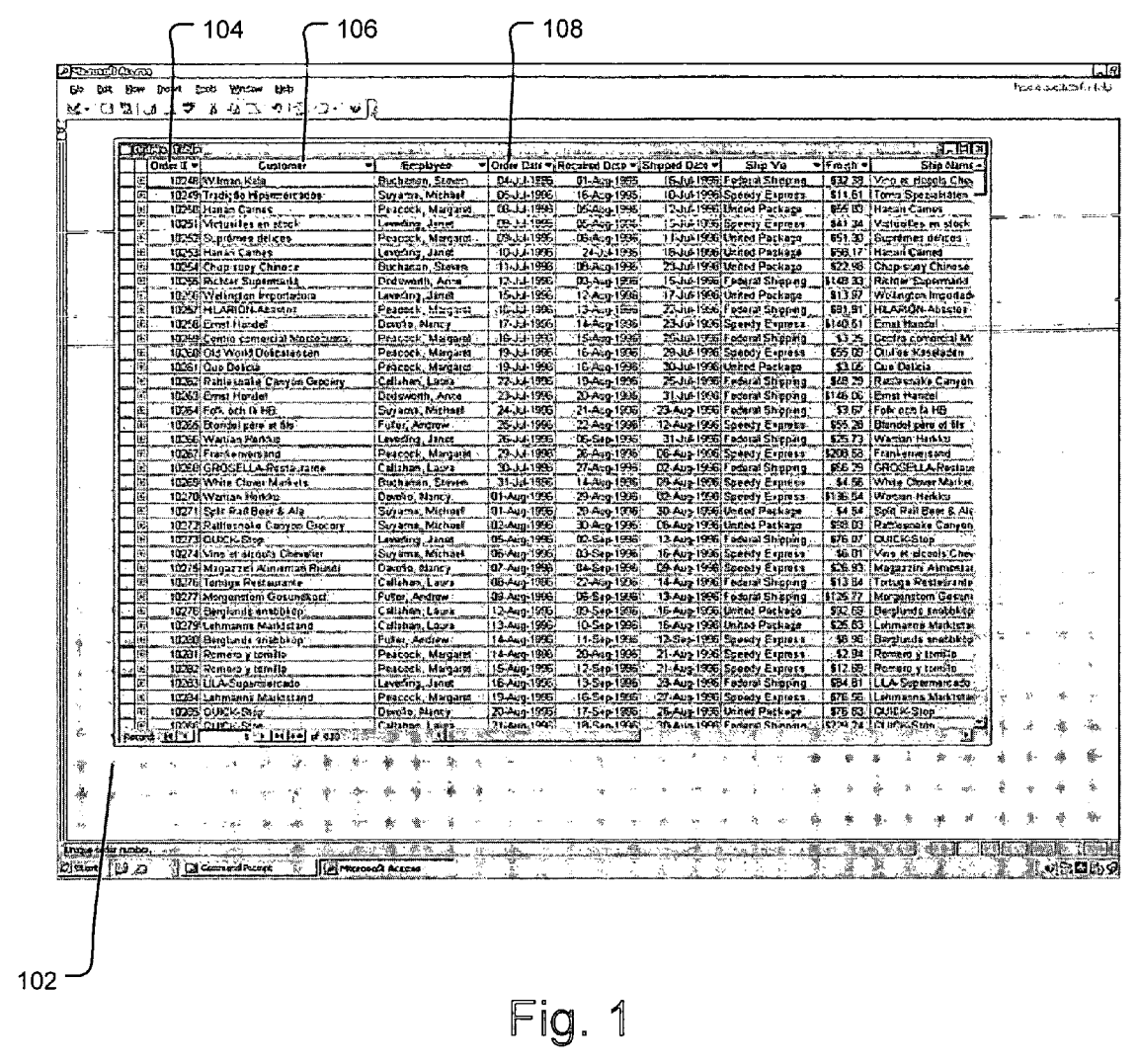

FIG. 1 illustrates a screenshot of a tabular view 102 of a product order database within a database management system. The table 102 includes a table comprised of multiple rows and columns of data. Each row of data generally comprises a single data record. Generally, each column of data in a database can be counted on to include data elements of a homogenous type. For example, the Order ID column 104 includes data elements in numeric format, the Customer column 106 includes data in the form of alphanumeric strings, the Order Date column 108 includes data in date format, and so on. The Order ID column of a single record corresponds to that Order ID field of that record. A collection of fields thus may comprise a column. One skilled in the art will appreciate that many other types of data can be kept in a database, and displayed using a table within a database management system. The present invention allows a complex hierarchy of data to be modeled using the conceptualization of a simple database table (similar in appearance to database table 102, but structurally different), relieving users of the burden of forming sophisticated queries across multiple tables, and flipping back and forth between multiple tables to view and manipulate data.

Figure 2:
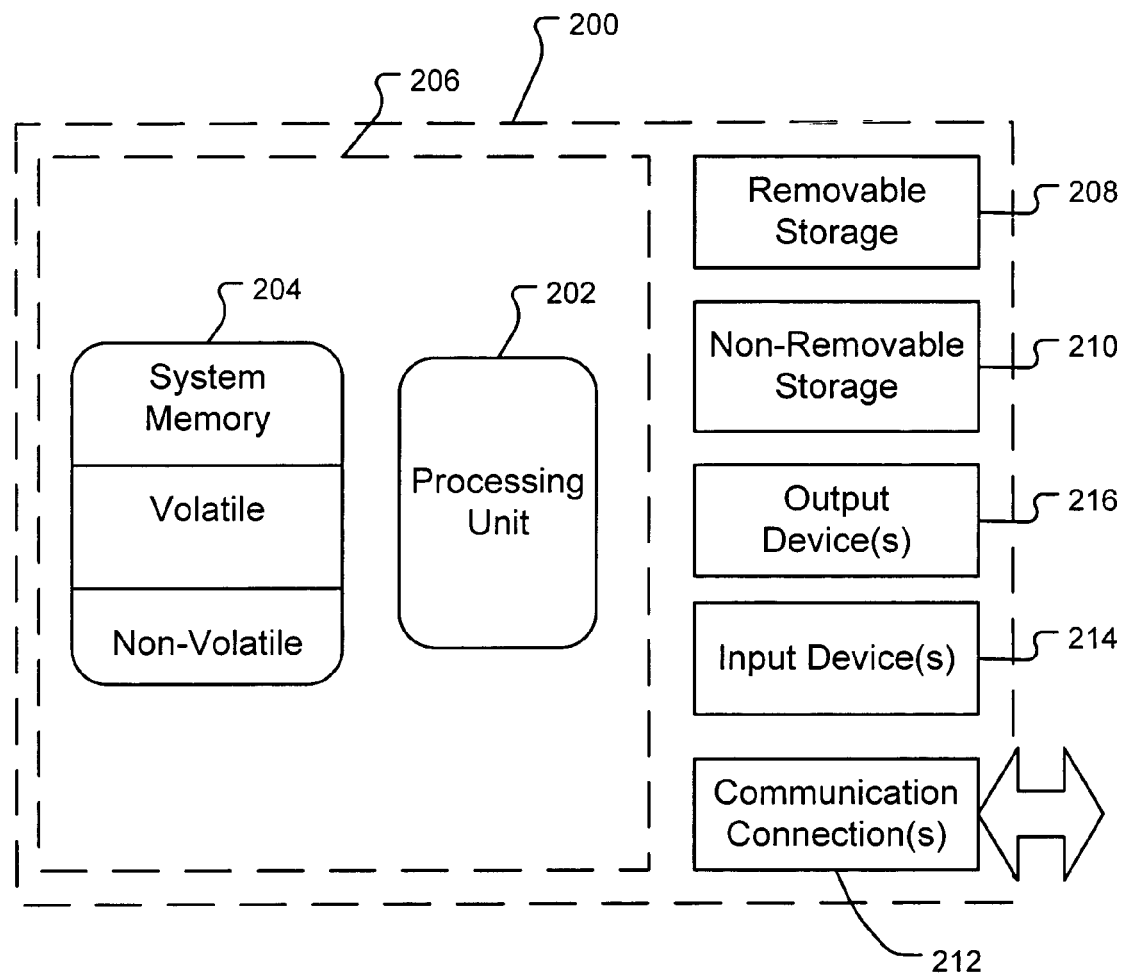
FIG. 2 illustrates an example of a suitable computing system environment on which an embodiment of the present invention may be implemented.

Given that the present invention may be implemented as a computer system, FIG. 2 is provided to illustrate an example of a suitable computing system environment on which embodiments of the invention may be implemented. In its most basic configuration, system 200 includes at least one processing unit 202 and memory 204. Depending on the exact configuration and type of computing device, memory 204 may be volatile (such as RAM), non-volatile (such as ROM, flash memory, etc.) or some combination of the two. This most basic configuration is illustrated in FIG. 2 by dashed line 206.

In addition to the memory 204, the system may include at least one other form of computer-readable media. Computer-readable media can be any available media that can be accessed by the system 200. By way of example, and not limitation, computer-readable media might comprise computer storage media and communication media.

Computer storage media includes volatile and nonvolatile, removable and non-removable media implemented in any method or technology for storage of information such as computer readable instructions, data structures, program modules or other data. Memory 204, removable storage 208, and non-removable storage 210 are all examples of computer storage media. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by system 200. Any such computer storage media may be part of system 200.

System 200 may also contain a communications connection(s) 212 that allow the system to communicate with other devices. The communications connection(s) 212 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

In accordance with an embodiment, the system 200 includes peripheral devices, such as input device(s) 214 and/or output device(s) 216. Exemplary input devices 214 include, without limitation, keyboards, computer mice, pens, or styluses, voice input devices, tactile input devices and the like. Exemplary output device(s) 216 include, without limitation, devices such as displays, speakers, and printers. For the purposes of this invention, the display is a primary output device. Each of these devices is well know in the art and, therefore, not described in detail herein.

With the computing environment in mind, the following figures are described with reference to logical operations being performed to implement processes embodying various embodiments of the present invention. These logical operations are implemented (1) as a sequence of computer implemented steps or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

Figure 3:
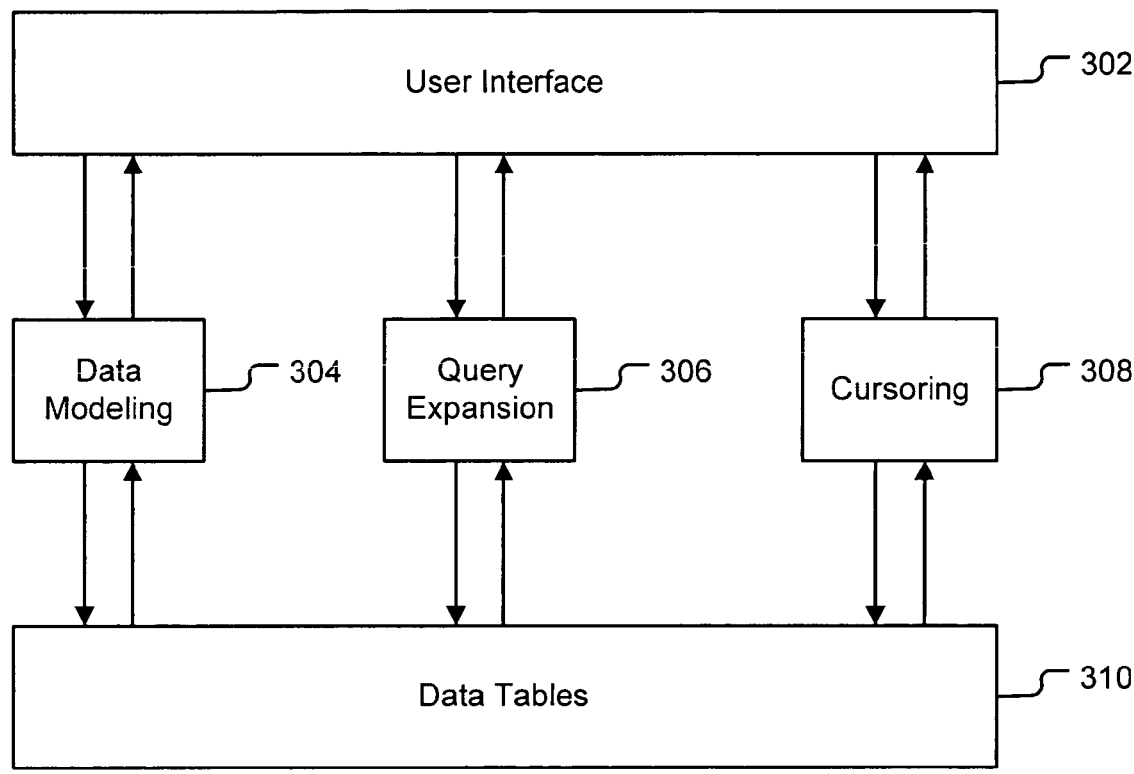
FIG. 3 illustrates the modules present in one embodiment of the present invention.

FIG. 3 illustrates modules in accordance with one embodiment of the present invention. A user interface module allows users to view, modify, query, and otherwise manipulate data. User interaction with data modeling module 304, query expansion module 306, and cursor modeling module 308 therefore takes place through user interface module 302. Likewise, data from said modules 304, 306, and 308 is displayed via user interface module 302.

User interface 302 passes table hierarchy parameters to data modeling module 304, and may, additionally, receive feedback from data modeling module 304 to aid a user with further table definition or modification. User interface module 302 passes queries supplied by a user to query expansion module 306, and likewise receives query results from query expansion module 306. User interface module 302 passes requests from a user for data to cursoring module 308 for data retrieval, and likewise receives retrieved data from cursoring module 308.

In one embodiment, user interface module 302 directly renders data returned from one or more of modules 304, 306 and 308 on a display. In an alternate embodiment, user interface module 302 uses Application Programming Interfaces (APIs) to update a display.

Data modeling module 304 allows creation and modification of a conceptual table. A conceptual table is a data table which may contain complex (non-scalar) data in the form of another table, as well as complex data. A data table typically includes only scalar data, and may include numbers, alphanumeric strings, fractions, and the like. Complex data may include one or more nested tables, which may themselves include additional levels of nested tables. A conceptual table can contain arbitrarily many such hierarchically related tables. A given field in a conceptual table may therefore be physically mapped to a field in another table altogether. Further, this physical mapping and its consequences may be entirely transparent to a user. Data modeling module 304 may receive parameters specified by a user for a conceptual table from user interface 302.

In one embodiment, a conceptual table is stored as one or more data tables containing scalar data. Scalar data values that exist only in the conceptual table are stored in a data table specifically allocated for non-mapped scalar values. One or more data values that physically map to a data table are "shredded" by data modeling module 304 such that those data values are physically stored in that data table 310. As a result, the user need only deal with a single conceptual table, while the complexities of translating the conceptual table to multiple hierarchical tables for storage are transparent to the user. Likewise, the implementation of shredding does not necessarily involve any added complexity in the database storage engine or database query processor.

In an embodiment, data values in a conceptual table are shredded to the appropriate data tables when a complex column is added to a table. In an alternative embodiment, data values in a conceptual table are shredded to the appropriate data tables when a save command is received from a user. In yet another embodiment, data values in a conceptual table are shredded to the appropriate data tables whenever a value change is detected.

Query expansion module 306 receives a conceptual table query from user interface module 302 and expands the query based on the hierarchical structure of the conceptual table. In one embodiment, query expansion module 306 expands a query based on the hierarchical structure of the conceptual table, using a set of rules defined by a developer. An exemplary set of query expansion rules is set forth below in Tables 1-11.

In an alternate embodiment, query expansion module 306 expands a query by joining (a term of art in the database field, analogous to combining) a subset of relevant data tables together into a single data table, and then executes the conceptual table query on that single data table. In another alternate embodiment, query expansion module 306 expands a query by joining all data tables 310 linked by a conceptual table, regardless of relevance, into a single data table, and then executes the conceptual table query on that single data table.

In an embodiment, query expansion module 306 performs queries directly on data tables 310. In an alternate embodiment, query expansion module 306 submits the expanded query to a database server for execution. Such an embodiment does not necessarily require any changes to the query processor or database server.

Cursoring module 308 enables reading and navigation of a conceptual table. When a signal is received via user interface 302 to open a conceptual table, cursoring module 308 analyzes any mappings to data tables that exist. Scalar data values from those data tables are retrieved using the mappings, and the scalar data values are returned to user interface 302 for display.

If a user selects a conceptual table field containing a data table, the table mapping in the field is referenced. A snapshot of the mapped-to data tables is taken, and the results are displayed in the conceptual table. In one embodiment, the mapped-to data tables are also locked for editing so that their contents cannot change. In an alternate embodiment, the mapped-to data tables are not locked, and instead, the mapped-to data tables are periodically checked for updates to be propagated to the displayed conceptual table.

One skilled in the art will recognize that while the exemplary embodiments presented in conjunction with FIG. 3 involve a conceptual table that may include data tables, arbitrarily many levels of indirection may be used without departing from the scope of the claimed invention. For example, a conceptual table may include one or more conceptual tables, which may themselves include still other conceptual tables. In this situation, care must be taken to prevent an infinite loop, namely a conceptual table referring (either directly or indirectly) to itself, thus creating an infinite number of levels of indirection.

In an embodiment, data modeling module 304 may perform data stores atomically. This means that in any given data store attempt, either all or none of the data tables are updated. As such, reading data while the data tables are in a transitional state may be avoided. Atomic data table writes may be performed via semaphore, file locking, or other method known to those skilled in the art, and may additionally incorporate rollback (undoing one or more pending writes).

Figure 4:
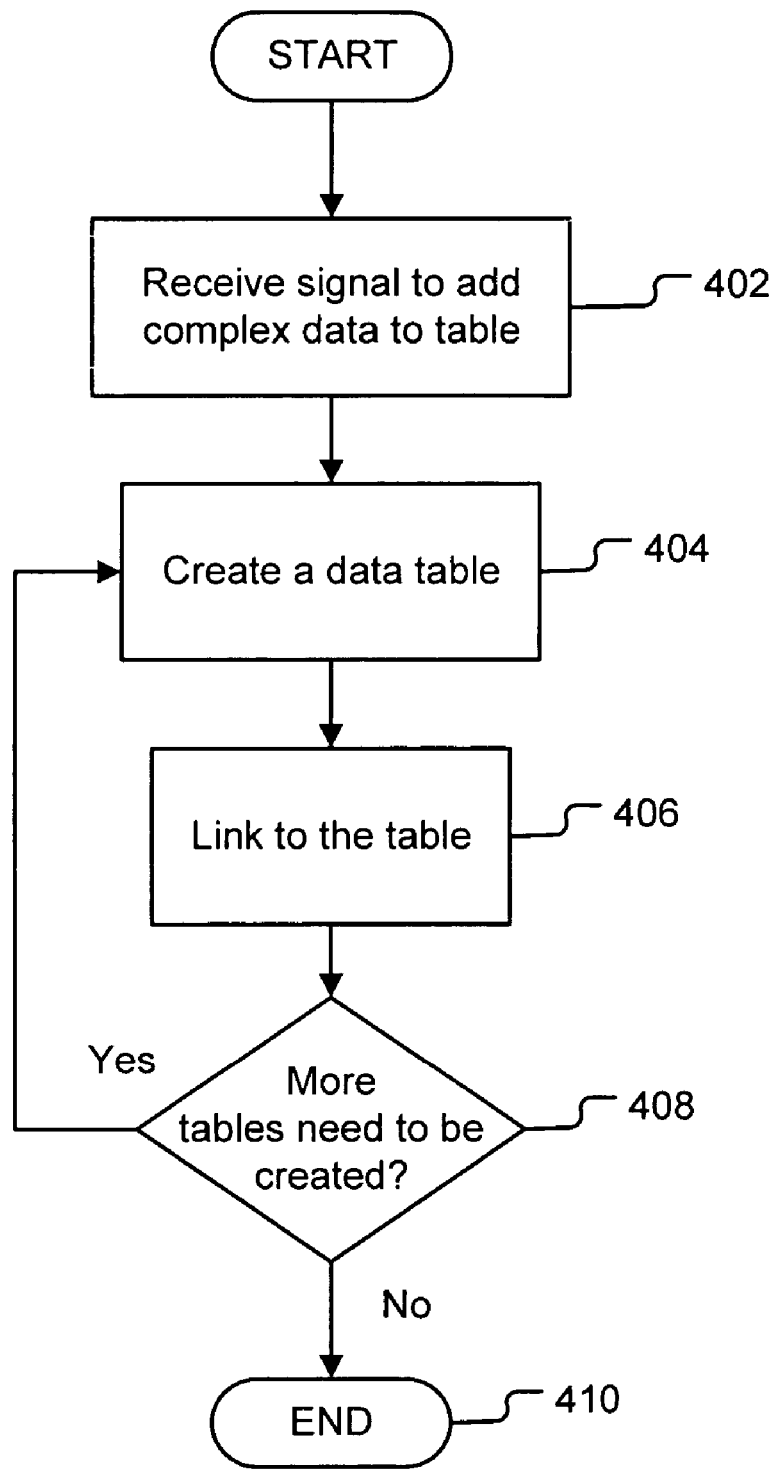
FIG. 4 illustrates the operational flow of the operations performed in accordance with an embodiment of the present invention.

FIG. 4 illustrates an operational flow in accordance with one embodiment of the invention, in which a conceptual table is created. Receive operation 402 receives a signal from a user to add a complex data type to an existing table or conceptual table. This signal may be received from a user via a user interface, from an automated computer process, or other source of input. This receipt triggers creation operation 404 to create at least one data table.

Creation operation 404 creates at least one data table to contain any scalar values associated with the complex data. Data entered into the complex data field will be shredded into the corresponding data table when the conceptual table is stored. In one embodiment, each created data table takes the form of one or more database files. In another embodiment, each created data table takes the form of a data structure within one or more database files. In yet another embodiment, creation operation 404 additionally initializes one or more scalar values to a default value within each created data table. In one embodiment where a suitable data table already exists, create operation 404 may be omitted and the data table may simply be linked to.

Following create operation 404, link operation 406 adds one or more links to the conceptual table, corresponding to the one or more data tables created by creation operation 404. A link may be used to locate a data table when a complex data field is selected via cursoring (described above, in conjunction with FIG. 3, and below, in conjunction with FIG. 7). A link may also be used to locate a data table when a scalar value within a complex data field is added or modified (described above, in conjunction with FIG. 3).

Determine operation 408 determines whether additional tables are required to accommodate the complex data. If more tables are needed, flow branches YES back to create operation 404. If no more tables are needed, flow branches NO to end of flow 410.

Once end of flow 410 has been reached, complex data may be viewed or manipulated using cursoring (discussed above in conjunction with FIG. 3, and below in conjunction with FIG. 7), and stored via shredding (discussed above in conjunction with FIG. 3, and below in conjunction with FIG. 5).

In an embodiment, an existing data table may be inserted into a conceptual table. In such an embodiment, a verification operation (not pictured) would verify the existence of the data table, and creation operation 404 would be omitted.

Figure 5:
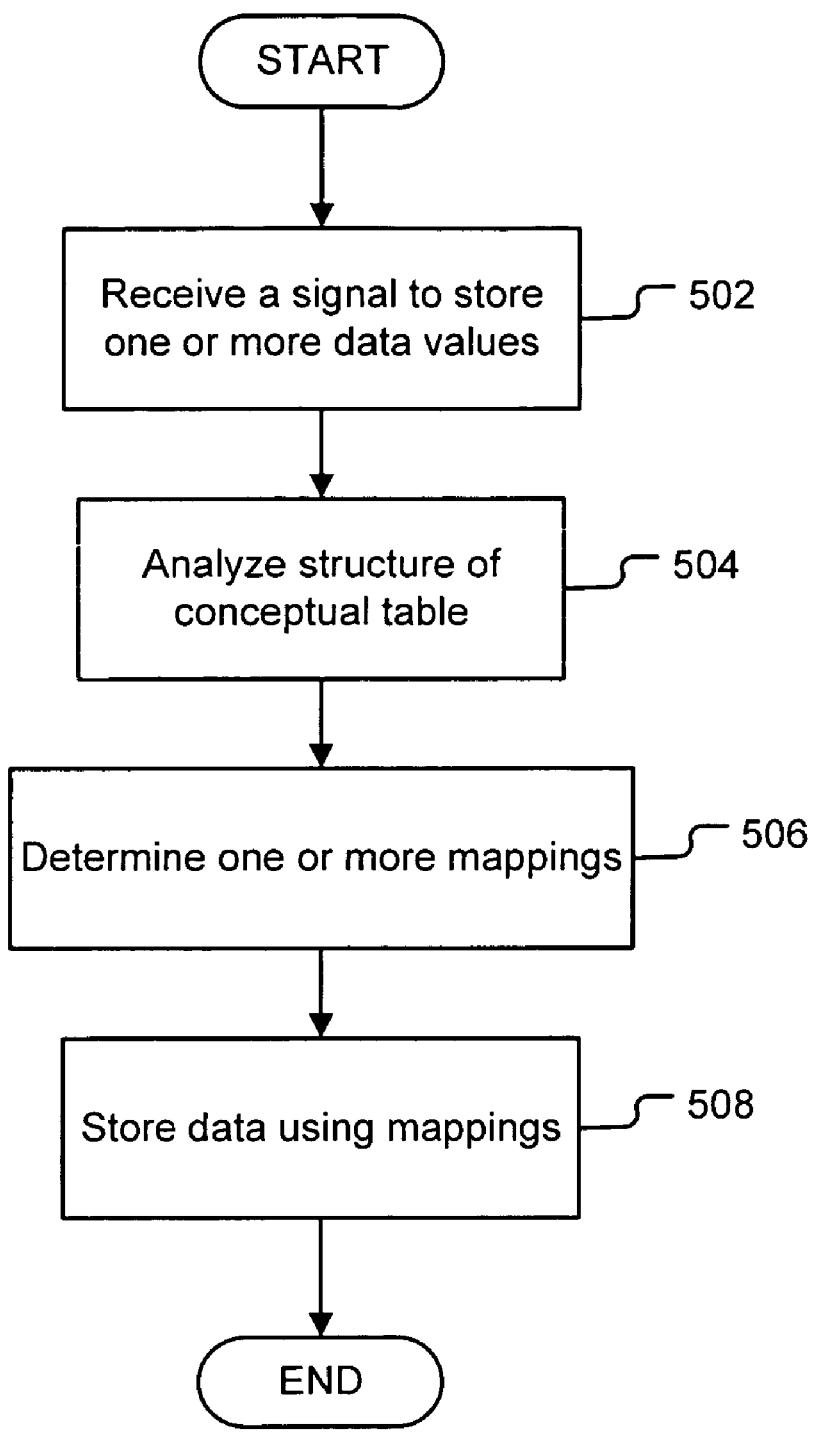
FIG. 5 illustrates the operational flow of the operations performed in accordance with an embodiment of the present invention.

FIG. 5 illustrates an operational flow in accordance with one embodiment of the present invention in which data from a conceptual table is shredded and stored to one or more corresponding data tables.

Receive operation 502 receives a signal to store one or more complex data values associated with a conceptual table.

The signal may be the result of a user explicitly saving data within a database management application. Alternatively, the signal may be received from an automated process that synchronizes modified data. Receipt of a signal by receive operation 502 triggers analyze operation 504.

Analyze operation 504 analyzes the conceptual table through which the complex data values are stored, and determines the structure of the conceptual table. Based on this structural data, determine operation 506 determines one or more mappings to locations in data tables. These mappings may be in the form of a set of data table coordinates, a pointer to a memory location containing a data table, a data table file name, unique record identification number, or other means by which data may be addressed, or any combination thereof.

Store operation 508 stores one or more data values from the conceptual table into the data value's respective data table using these mappings, at which time the conceptual table data has been successfully shredded. The data may later be "unshredded" via cursoring (described above, in conjunction with FIG. 3 and below, in conjunction with FIG. 7). In an embodiment, store operation 508 performs data stores atomically. In another embodiment, store operation 508 can roll back incomplete stores.

Figure 6:
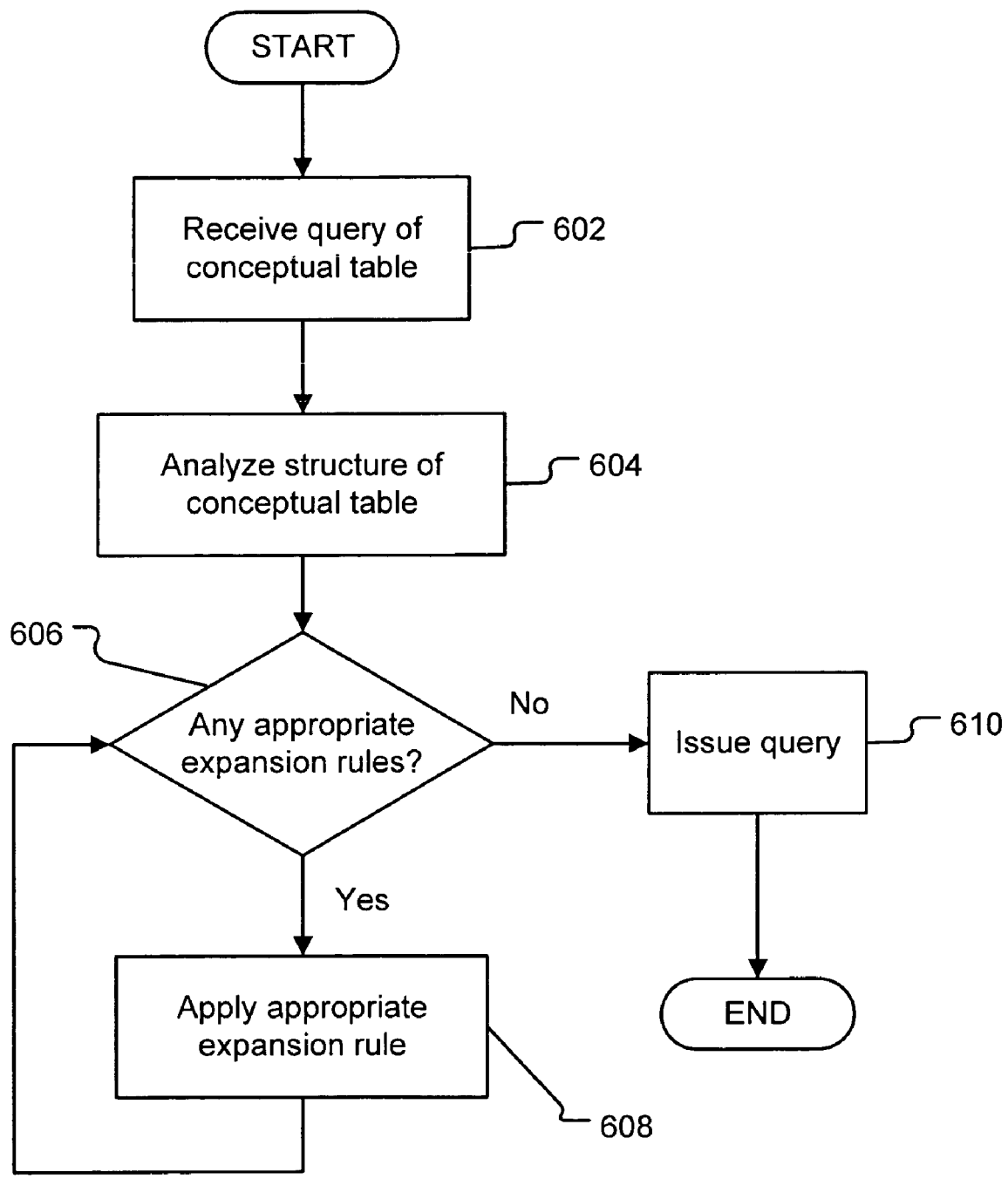
FIG. 6 illustrates the operational flow of the operations performed in accordance with an embodiment of the present invention.

FIG. 6 illustrates an operational flow in accordance with one embodiment of the present invention in which a query of a conceptual table is expanded to process shredded data. Receive operation 602 receives a query of a conceptual table. In one embodiment, such a query may be entered in text form by a user. In another embodiment, said query may be fully or partially constructed using a graphical user interface. In still another embodiment, said query may be generated automatically by a computer.

Analyze operation 604 analyzes the conceptual table through which the complex data is to be queried, and determines the structure of the conceptual table along with any associated mappings to data tables. These mappings may take on any of several different forms (as discussed previously in conjunction with FIG. 5).

Determine operation 606 uses the structural data and mappings from analyze operation 604, in conjunction with a set of expansion rules, to determine if any rules are appropriate for the query and whether those rules call for an expansion. If no rules are appropriate for the query, or if an applicable rule dictates that the expansion is complete, flow branches NO to issue operation 610. If one or more rules are appropriate for the query, flow branches YES to apply operation 608.

If one or more expansion rules are appropriate to apply to a query, apply operation 608 expands the query according to those rules. In one embodiment, apply operation may create a new query as part of expanding the query. Some exemplary expansion rules are set forth below in Tables 1-11, including expanding using such SQL terms as JOIN to combine data tables together before evaluating data. One skilled in the art will appreciate that determine operation 606 and apply operation 608 may take place repeatedly before a query is fully expanded and thus ready to be issued by issue operation 610. More than one rule can be applied in a variety of orders, and a single rule may be applied more than once in the expansion of a query. In an embodiment implementing incremental expansion of a query, query expansion rules may be kept orthogonal to each other, and thus kept relatively simple. In an embodiment performing incremental expansion of a query, a data structure may be necessary to store intermediate results of incremental expansion rule application. In an alternative embodiment, a plurality of query expansion rules may be applied by apply operation 608.

Issue operation 610 issues a query expanded by determine and apply operations 606 and 608. In an embodiment, issue operation 610 queries database data directly. In an alternative embodiment, issue operation 610 sends the query to a database server.

Figure 7:
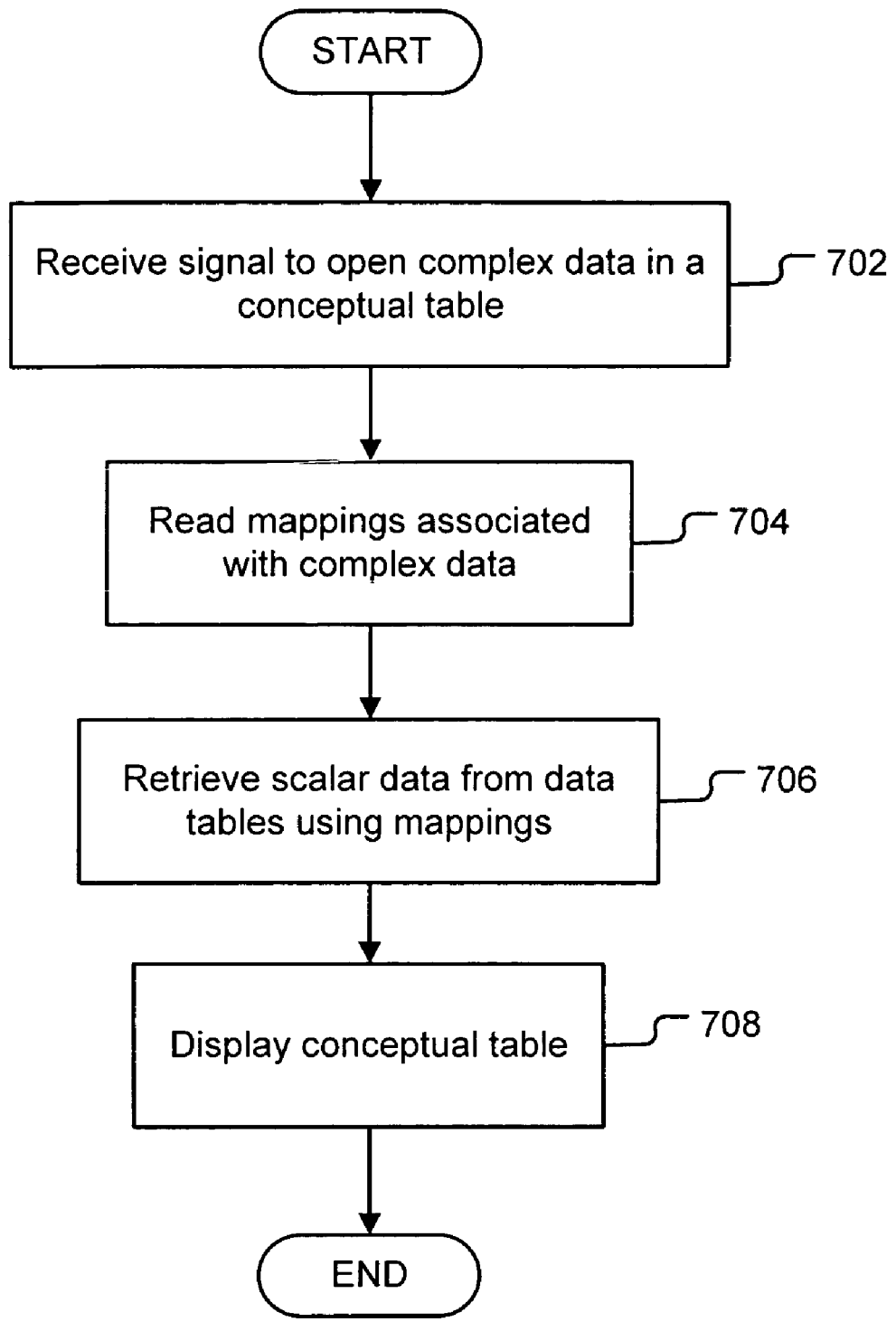
FIG. 7 illustrates the operational flow of the operations performed in accordance with an embodiment of the present invention.

FIG. 7 illustrates an operational flow in accordance with one embodiment of the present invention, in which cursoring enables data to be retrieved from a shredded conceptual table. Receive operation 702 receives a signal to open complex data in a conceptual table. Such a signal may result from a user opening an existing conceptual table containing complex data that must be displayed, from a user moving the cursor to a conceptual table field containing complex data, or via other user-generated or computer-generated inputs.

Read operation 704 reads one or more mappings to locations in data tables that are associated with the conceptual table. As discussed previously, these mappings may take a variety of forms. Retrieve operation 706 then retrieves scalar data values from the data tables indicated by the mappings. The scalar values retrieved by retrieve operation 706 are used to populate a conceptual table, which is displayed by display operation 708.

Display operation 708 displays the conceptual table containing the scalar values retrieved by retrieve operation 706. Display operation 708 may directly render the conceptual table on the screen in one embodiment, may rely on Application Programming Interfaces (APIs) to perform rendering in another embodiment, or may use other methods for displaying data known to those skilled in the art in still other envisioned embodiments.

One skilled in the art will appreciate that the embodiments claimed herein may be used not only in the context of database and spreadsheet applications which use complex data types, but also in the context of collaborative service suites such as Microsoft®V Sharepoint. Such suites may incorporate their own complex data types containing multiple values (e.g., multiple choices, attached files, etc). These complex data types may be handled substantially the same as in the exemplary embodiments discussed herein.

In one particular embodiment, a set of SQL query expansion rules is used by query expansion module 306 (FIG. 3), and by determine operation 606 and apply operation 608 (FIG. 6). An exemplary set of several SQL query expansion rules is presented in Tables 1-11. These rules deal with situations of varying complexity. In an example (Table 1), a relatively simple SELECT query is expanded. A simple SELECT query is defined as a query that has no grouping or aggregates. When there are no restrictions on complex scalar fields, only the parent table needs to be referenced in the expanded query. When there is a restriction on a complex scalar in the WHERE clause of a query, a join between a table and complex data type must be performed (see Table 1 for a basic example). Filters in the WHERE clause must be modified as necessary to reference a complex data type instead of a complex column in a table. Fields in SELECT clauses must be similarly modified using proper table references. When a non-left join on a complex scalar must be performed between a table and another table, the expanded query will include a subquery to join the parent table and its complex table (see Table 4 for a basic example). If a NOT appears in the WHERE clause of an unexpanded query, the NOT will be translated into [Table].[Complex Column] NOT IN (SELECT [Complex Column] FROM [Table]JOIN [Flat Table] ON [Table].[Complex Column]=[Flat Table].[Foreign Key] WHERE [Flat Table].[Complex Scalar]=value).

Tables 4-11 illustrate expansion rules for queries with aggregates. One such rule is that aggregates of complex types are executed against a LEFT JOIN of the table and complex data type. Another such rule is that when there are aggregates of different complex types in the unexpanded query, each aggregate will be computed using a subquery. Also, occurrences of the HAVING clause (Table 10) will be converted to a WHERE clause in an outer query. If a HAVING clause references a complex type that is not otherwise referenced in an aggregate SELECT list, a new subquery may be created to join the table and the complex type.

TABLE 1

Example Filter on a Complex Scalar

| | |
|---|---|
| User-written Query | SELECT IssueName<br>FROM Issues<br>WHERE AssignedTo.PersonID = 1 |
| Expanded Query | SELECT DISTINCTROW Issues.IssueName<br>FROM Issues LEFT OUTER JOIN f__AssignedTo<br>ON Issues.AssignedToID = f__AssignedTo.AssignedToID<br>WHERE f__AssignedTo.PersonID = 1 |

TABLE 2

Example Filter on multiple Complex Scalars

| | |
|---|---|
| User-written Query | SELECT IssueName<br>FROM Issues<br>WHERE AssignedTo.PersonID = 1 OR ResolvedBy.PersonID = 2 |
| Expanded Query | SELECT DISTINCTROW Issues.IssueName<br>FROM (Issues LEFT OUTER JOIN f__AssignedTo ON Issues.AssignedToID = f__AssignedTo.AssignedToID)<br>LEFT OUTER JOIN f__ResolvedBy ON Issues.ResolvedByID = f__ResolvedBy.ResolvedByID<br>WHERE f__AssignedTo.PersonID = 1 OR f__ResolvedByID = 2 |

TABLE 3

Example Subqueries when joining on a Complex Scalar

| | |
|---|---|
| User-Written Query | SELECT Issues.IssueName, X.PersonName<br>FROM Issues INNER JOIN Persons X ON Issues.AssignedToID = X.PersonID<br>WHERE AssignedTo.PersonID = 1 |
| Expanded Query | SELECT DISTINCTROW Y.IssueName, X.PersonName<br>FROM (SELECT Issues.IssueName, f__AssignedTo.PersonID FROM Issues LEFT OUTER JOIN f__AssignedTo ON Issues.AssignedToID = f__AssignedTo.AssignedToID) AS Y INNER JOIN Persons X ON X.PersonID = Y.PersonID<br>WHERE Y.PersonID = 1 |

TABLE 4

Example Aggregate on a Complex Type

| | |
|---|---|
| User-Written Query | SELECT IssueName, COUNT(AssignedTo)<br>FROM Issues<br>GROUP BY IssueName |
| Expanded Query | SELECT Issues.IssueName, COUNT(f__AssignedTo.PersonID) AS CountOfPersonID FROM Issues LEFT OUTER JOIN f__AssignedTo ON Issues.AssignedTo=f__AssignedTo.AssignedTo<br>GROUP BY Issues.IssueName |

TABLE 5

Aggregate on a Complex Type with a Restriction on the same Complex Scalar

| | |
|---|---|
| User-Written Query | SELECT IssueName, COUNT(AssignedTo)<br>FROM Issues<br>WHERE AssignedTo.PersonID =3<br>GROUP BY IssueName |
| Expanded Query | SELECT x.IssueName,<br>COUNT(f__AssignedTo.PersonID) AS CountOfPersonID<br>FROM<br>(SELECT DISTINCTROW Issues.IssueName, Issues.AssignedTo<br>FROM Issues LEFT JOIN f__AssignedTo ON Issues.AssignedTo=f__AssignedTo.AssignedTo<br>WHERE f__AssignedTo.PersonID = 3) AS X<br>INNER JOIN f__AssignedTo ON x.AssignedTo = f__AssignedTo.AssignedTo<br>GROUP BY Issues.IssueName |

TABLE 6

Example Aggregate on a Complex Type with a Restriction on a different Complex Scalar

| | |
|---|---|
| User-Written Query | SELECT IssueName, COUNT(AssignedTo)<br>FROM Issues<br>WHERE ResolvedBy.PersonID = 3 |
| Expanded Query | SELECT x.IssueName,<br>COUNT(f__AssignedTo.PersonID) AS CountOfPersonID<br>FROM<br>(SELECT DISTINCTROW Issues.IssueName, Issues.AssignedTo, Issues.ResolvedBy<br>FROM Issues LEFT JOIN f__ResolvedBy ON Issues.ResolvedBy=f__ResolvedBy.ResolvedBy<br>WHERE f__ResolvedBy.PersonID = 3) AS X<br>INNER JOIN f__AssignedTo ON x.AssignedTo = f__AssignedTo.AssignedTo<br>GROUP BY Issues.IssueName |

TABLE 7

Example Aggregate Complex Type 1 with a Restriction on Complex Scalar 1 and Complex Scalar 2

| | |
|---|---|
| User-Written Query | SELECT IssueName, COUNT(AssignedTo)<br>FROM Issues<br>WHERE AssignedTo.PersonID = 2<br>OR ResolvedBy.PersonID = 3 |
| Expanded Query | SELECT x.IssueName,<br>COUNT(f__AssignedTo.PersonID) AS CountOfPersonID<br>FROM<br>(SELECT DISTINCTROW Issues.IssueName, Issues.AssignedTo, Issues.ResolvedBy<br>FROM (Issues LEFT JOIN f__AssignedTo ON Issues.AssignedTo = f__AssignedTo.AssignedTo) LEFT JOIN f__ResolvedBy ON Issues.ResolvedBy=f__ResolvedBy.ResolvedBy<br>WHERE f__AssignedTo.PersonID = 2 OR f__ResolvedBy.PersonID = 3) AS X<br>INNER JOIN f__AssignedTo ON x.AssignedTo = f__AssignedTo.AssignedTo<br>GROUP BY Issues.IssueName |

TABLE 8

Example Aggregates on Complex Type 1 and Complex Type 2

| | |
|---|---|
| User-Written Query | SELECT IssueName, COUNT(AssignedTo), COUNT(ResolvedBy)<br>FROM Issues<br>GROUP BY IssueName |

TABLE 8-continued

Example Aggregates on Complex Type 1 and Complex Type 2

| | |
|---|---|
| Expanded Query | SELECT [Count of AssignedTo Per Issue].IssueName, [Count of AssignedTo Per Issue].CountOfATPersonID, [Count of ResolvedBy Per Issue].CountOfRBPersonID FROM (SELECT Issues.IssueName, COUNT(f_AssignedTo.PersonID) AS CountOfATPersonID FROM Issues LEFT JOIN f_AssignedTo ON Issues.AssignedTo=f_AssignedTo.AssignedTo GROUP BY Issues.IssueName) AS [Count of AssignedTo Per Issue] INNER JOIN (SELECT Issues.IssueName, Count(f_ResolvedBy.PersonID) AS CountOfRBPersonID FROM Issues LEFT JOIN f_ResolvedBy ON Issues.ResolvedBy=f_ResolvedBy.ResolvedBy GROUP BY Issues.IssueName) AS [Count of ResolvedBy Per Issue] ON [Count of AssignedTo Per Issue].IssueName = [Count of ResolvedBy Per Issue].IssueName |

TABLE 9

Example Aggregates on Complex Type 1 and Complex Type 2 with Restrictions on Complex Scalar 1 and Complex Scalar 2

| | |
|---|---|
| User-Written Query | SELECT IssueName, COUNT(AssignedTo), COUNT(ResolvedBy) FROM Issues GROUP BY IssueName WHERE (AssignedTo.PersonID = 1 AND ResolvedBy.PersonID = 3) OR (AssignedTo.PersonID = 3 AND ResolvedBy.PersonID = 5) |
| Expanded Query | SELECT [Count of AssignedTo Per Issue].IssueName, [Count of AssignedTo Per Issue].CountOfATPersonID, [Count of ResolvedBy Per Issue].CountOfRBPersonID FROM (SELECT Issues.IssueName, COUNT(f_AssignedTo.PersonID) AS CountOfATPersonID FROM (SELECT DISTINCTROW Issues.IssueName, Issues.AssignedTo, Issues.ResolvedBy FROM (Issues LEFT OUTER JOIN f_AssignedTo ON Issues.AssignedTo = f_AssignedTo.AssignedTo) LEFT OUTER JOIN f_ResolvedBy ON Issues.ResolvedBy = f_ResolvedBy.ResolvedBy WHERE (f_AssignedTo.PersonID = 1 AND f_ResolvedBy.PersonID = 3) OR (f_AssignedTo.PersonID = 3 AND f_ResolvedBy.PersonID = 5)) AS X LEFT JOIN f_AssignedTo ON X.AssignedTo=f_AssignedTo.AssignedTo GROUP BY X.IssueName) AS [Count of AssignedTo Per Issue] INNER JOIN (SELECT Issues.IssueName, COUNT(f_ResolvedBy.PersonID) AS CountOfRBPersonID FROM (SELECT DISTINCTROW Issues.IssueName, Issues.AssignedTo, Issues.ResolvedBy FROM (Issues LEFT OUTER JOIN f_AssignedTo ON Issues.AssignedTo = f_AssignedTo.AssignedTo) LEFT OUTER JOIN f_ResolvedBy ON Issues.ResolvedBy = f_ResolvedBy.ResolvedBy WHERE (f_AssignedTo.PersonID = 1 AND f_ResolvedBy.PersonID = 3) OR (f_AssignedTo.PersonID = 3 AND f_ResolvedBy.PersonID = 5)) AS Y LEFT JOIN f_ResolvedBy ON Y.ResolvedBy=f_ResolvedBy.ResolvedBy GROUP BY Y.IssueName) AS [Count of ResolvedBy Per Issue] ON [Count of AssignedTo Per Issue].IssueName = [Count of ResolvedBy Per Issue].IssueName |

TABLE 10

Example Complex Type in the HAVING Clause

| | |
|---|---|
| User-Written Query | SELECT IssueName FROM Issues GROUP BY IssueName HAVING COUNT(AssignedTo) = 4 |
| Expanded Query | SELECT Issues.IssueName FROM Issues LEFT JOIN f_AssignedTo ON Issues.AssignedTo=f_AssignedTo.AssignedTo GROUP BY Issues.IssueName HAVING COUNT(f_AssignedTo.PersonID)=4 |

TABLE 11

Example Aggregate on Complex Type 1 with Complex Type 2 in the HAVING Clause

| | |
|---|---|
| User-Written Query | SELECT IssueName, COUNT(ResolvedBy) FROM Issues GROUP BY IssueName HAVING Count(AssignedTo) = 4 |
| Expanded Query | SELECT [Count of ResolvedBy Per Issue].IssueName, [Count of ResolvedBy Per Issue].CountOfRBPersonID FROM (SELECT Issues.IssueName, Count(f_ResolvedBy.PersonID) AS CountOfRBPersonID FROM Issues LEFT JOIN f_ResolvedBy ON Issues.ResolvedBy=f_ResolvedBy.ResolvedBy GROUP BY Issues.IssueName) AS [Count of ResolvedBy Per Issue] INNER JOIN (SELECT Issues.IssueName, COUNT(f_AssignedTo.PersonID) AS CountOfATPersonID FROM Issues LEFT JOIN f_AssignedTo ON Issues.AssignedTo=f_AssignedTo.AssignedTo GROUP BY Issues.IssueName) AS [Count of AssignedTo Per Issue] ON [Count of AssignedTo Per Issue].IssueName = [Count of ResolvedBy Per Issue].IssueName WHERE [Count of AssignedTo Per Issue].CountOfATPersonID = 4 |

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A computer-implemented method for adding complex data to, and modeling complex data in, an existing conceptual table, wherein the existing conceptual table is stored as one or more data tables comprising scalar data, the method comprising:

receiving an instruction to add a complex data type to the existing conceptual table, wherein the complex data type comprises one or more nested tables;

upon receiving the instruction to add the complex data type, creating one or more data tables for storing scalar values associated with the complex data type;

creating one or more links to the existing conceptual table corresponding to the one or more data tables for storing scalar values associated with the complex data type;

receiving an instruction to store a first complex data value associated with the existing conceptual table;

analyzing a structure of the existing conceptual table to determine structural data of the existing conceptual table;
using the structural data to determine a first mapping of the first complex data value to a first location of a first data table of the one or more data tables for storing scalar values associated with the complex data type;
using the first mapping to store the first complex data value from the existing conceptual table into the first location in the first data table;
receiving an instruction to store a scalar data value that exists only in the existing conceptual table, wherein the scalar data value is not associated with the complex data;
storing the scalar data value that exists only in the existing conceptual table in a second data table, wherein the second data table is specifically allocated for one or more non-mapped scalar data values;
receiving a query of the existing conceptual table requesting at least the first complex data value;
determining whether one or more expansion rules are appropriate to apply to the query and whether the one or more expansion rules call for an expansion, wherein the determining uses the structural data and the first mapping;
if the one or more expansion rules are appropriate to apply to the query, applying the one or more expansion rules to expand the query;
issuing the query;
in response to the expanded query of the existing conceptual table, querying the one or more data tables to obtain at least the first complex data value stored in the first location of the first data table;
receiving a selection of a first field in the existing conceptual table, wherein the first field comprises the first data table;
referencing the first mapping to the first data table;
taking a snapshot of the first data table; and
displaying results of the snapshot of the first data table in the existing conceptual table.

2. The computer-implemented method as defined in claim 1, wherein the applying the one or more expansion rules to the query is performed incrementally.

3. The computer-implemented method as defined in claim 1, wherein a plurality of the one or more expansion rules may be applied in the issuing of the query.

4. The computer-implemented method as defined in claim 1, wherein the applying the one or more expansion rules to the query further comprises:
combining a plurality of data tables into a model of the existing conceptual table; and
applying the query to the model of the existing conceptual table.

5. The computer-implemented method as defined in claim 1, wherein the issuing the query further comprises submitting the query to a database server for execution.

6. The computer-implemented method as defined in claim 1, wherein the issuing the query further comprises accessing directly a database having the existing conceptual table, the complex data, and the one or more data tables.

7. A computer system for existing conceptual table modeling comprising:
at least one processor; and
memory coupled to the at least one processor, the memory comprising computer program instructions executable by the at least one processor, and storing:
a data modeling module accessible by the computer system for adding complex data to the existing conceptual table, wherein the complex data comprises one or more nested tables, and for storing scalar values associated with the complex data to one or more data tables created in response to the adding complex data, wherein the data modeling module is further accessible by the computer system for modeling the complex data in the existing conceptual table for:
receiving an instruction to store a first complex data value associated with the existing conceptual table;
analyzing a structure of the existing conceptual table to determine structural data of the existing conceptual table;
using the structural data to determine a first mapping of the first complex data value to a first location of a first data table for storing scalar values associated with the complex data type; and
using the first mapping to store the first complex data value from the existing conceptual table into the first location of the first data table;
receiving an instruction to store a scalar data value that exists only in the existing conceptual table, wherein the scalar data value is not associated with the complex data;
storing the scalar data value that exists only in the existing conceptual table in a second data table, wherein the second data table is specifically allocated for one or more non-mapped scalar data values;
a query expansion module accessible by the computer system for:
receiving a query of the existing conceptual table requesting at least the first complex data value;
determining whether one or more expansion rules are appropriate to apply to the query and whether the one or more expansion rules call for an expansion, wherein the determining uses the structural data and the first mapping;
if the one or more expansion rules are appropriate to apply to the query, applying the one or more expansion rules to expand the query;
issuing the query;
in response to the expanded query of the existing conceptual table, querying the one or more data tables to obtain at least the first complex data value stored in the first location of the first data table;
a cursoring module accessible by the computer system for:
receiving a selection of a first field in the existing conceptual table, wherein the first field comprises the first data table;
referencing the first mapping to the first data table;
taking a snapshot of the first data table; and
displaying results of the snapshot of the first data table in the existing conceptual table.

8. The computer system as defined in claim 7, further comprising a display module accessible by the computer system for displaying the results from the cursoring module.

9. A computer-readable storage medium storing computer-executable instructions for a method for adding complex data to, and modeling complex data in, an existing conceptual table, wherein the existing conceptual table is stored as one or more data tables comprising scalar data, the method comprising:
receiving an instruction to add a complex data type to the existing conceptual table, wherein the complex data type comprises one or more nested tables;
upon receiving the instruction to add the complex data type, creating one or more data tables for storing scalar values associated with the complex data type;
creating one or more links to the existing conceptual table corresponding to the one or more data tables for storing scalar values associated with the complex data type;
receiving an instruction to store a first complex data value associated with the existing conceptual table;

analyzing a structure of the existing conceptual table to determine structural data of the existing conceptual table;

using the structural data to determine a first mapping of the first complex data value to a first location of a first data table of the one or more data tables for storing scalar values associated with the complex data type;

using the first mapping to store the first complex data value from the existing conceptual table into the first location of the first data table;

receiving an instruction to store a scalar data value that exists only in the existing conceptual table, wherein the scalar data value is not associated with the complex data;

storing the scalar data value that exists only in the existing conceptual table in a second data table, wherein the second data table is specifically allocated for one or more non-mapped scalar data values;

receiving a query of the existing conceptual table requesting at least the first complex data value;

determining whether one or more expansion rules are appropriate to apply to the query and whether the one or more expansion rules call for an expansion, wherein the determining uses the structural data and the first mapping;

if the one or more expansion rules are appropriate to apply to the query, applying the one or more expansion rules to expand the query;

issuing the query;

in response to the expanded query of the existing conceptual table, querying the one or more data tables to obtain at least the first complex data value stored in the first location of the first data table;

receiving a selection of a first field in the existing conceptual table, wherein the first field comprises the first data table;

referencing the first mapping to the first data table;

taking a snapshot of the first data table; and displaying results of the snapshot of the first data table in the existing conceptual table.

10. The computer-readable storage medium of claim 9, wherein the applying the one or more expansion rules to the query is performed incrementally.

11. The computer-readable storage medium of claim 9, wherein a plurality of the one or more expansion rules may be applied in said issuing of the query.

12. The computer-readable storage medium of claim 9, wherein the applying the one or more expansion rules to the query further comprises:

combining a plurality of data tables into a model of the existing conceptual table; and applying the query to the model of the existing conceptual table.

13. The computer-readable storage medium of claim 9, wherein the issuing the query further comprises submitting the query to a database server for execution.

14. The computer-readable storage medium of claim 9, wherein the issuing the query further comprises accessing directly a database having the existing conceptual table, the complex data, and the one or more data tables.

* * * * *